United States Patent [19]
White

[11] Patent Number: 5,544,716
[45] Date of Patent: Aug. 13, 1996

[54] DUAL, INDEPENDENT SENSOR VEHICLE IMPACT DETECTIN SYSTEM

[75] Inventor: Craig W. White, Grosse Pointe, Mich.

[73] Assignee: Automotive Systems Laboratory, Inc., Farmington Hills, Mich.

[21] Appl. No.: 493,713

[22] Filed: Jun. 22, 1995

[51] Int. Cl.$^6$ ................................................ B60R 21/32
[52] U.S. Cl. ...................... 180/274; 280/730.2; 280/735; 340/436
[58] Field of Search .................................. 280/735, 734, 280/730.2, 730.1, 728.1; 180/274, 282; 340/436, 438; 307/10.1

[56] References Cited

U.S. PATENT DOCUMENTS

| | | | |
|---|---|---|---|
| 4,836,024 | 6/1989 | Woehrl et al. | 73/514 |
| 4,966,388 | 10/1990 | Warner et al. | 280/730 |
| 4,995,639 | 2/1991 | Breed | 280/735 |
| 5,112,079 | 5/1992 | Haland et al. | 280/730 |
| 5,149,165 | 9/1992 | Woolley | 296/68.1 |
| 5,170,665 | 12/1992 | Janiaud et al. | 73/517 AV |
| 5,172,790 | 12/1992 | Ishikawa et al. | 180/268 |
| 5,202,831 | 4/1993 | Blackburn et al. | 364/424.05 |
| 5,224,732 | 7/1993 | Warner et al. | 280/730 |
| 5,231,253 | 7/1993 | Breed et al. | 200/61.45 R |
| 5,277,441 | 1/1994 | Sinnhuber | 280/730 R |
| 5,281,780 | 1/1994 | Haland | 200/52 R |
| 5,307,896 | 5/1994 | Taguchi et al. | 180/274 |
| 5,375,877 | 12/1994 | Yoshida et al. | 280/735 |

*Primary Examiner*—Eric D. Culbreth
*Assistant Examiner*—Peter C. English

[57] ABSTRACT

A vehicle impact detection system (10) for controlling the actuation of an occupant safety restraint device includes a dual, independent sensor arrangement (12) having a vibratory sensor (24) affixed to an outer surface (16) of the vehicle for continuously generating an output signal (14) representative of the condition of the outer surface, and a processor (22) for performing signal processing on the output signal (14) to predict the time at which a second crush sensor (26) will produce an output signal (18). The system (10) allows a single point outer surface sensor to reliably predict severe impacts within a few milliseconds of initial impact, and therefore is particularly suited for controlling the actuation of a safety restraint device in response to side impacts.

4 Claims, 1 Drawing Sheet

5,544,716

DUAL, INDEPENDENT SENSOR VEHICLE IMPACT DETECTIN SYSTEM

BACKGROUND OF THE INVENTION

The present invention relates generally to a vehicle crash discrimination system for controlling deployment of a passenger safety restraint device, such as an air bag.

Conventional vehicle crash discrimination systems are primarily designed to protect vehicle occupants from frontal collisions. Frontal collision detection systems tend to employ sensors which use an inertial sensing mass to detect deceleration of the vehicle. Because of the distance between the vehicle occupants and frontal impact points on the vehicle, conventional inertial sensors provide satisfactory results when a deployment decision can be made at least 30–40 milliseconds after the initial impact.

However, conventional crash discrimination systems are simply inadequate when deployment decisions must be made within a few milliseconds, such as in side impacts. To accommodate this severely restricted decisional time period, known side impact detection systems rely on one of three sensor arrangements: a contact switch or crush sensor, a pressure transducer, or a modified silicon (inertial mass) accelerometer. Examples of such sensor arrangements can be found in U.S. Pat. No. 4,995,639 to Breed, U.S. Pat. No. 4,966,388 to Warner et al, U.S. Pat. No. 5,202,831 to Blackburn et al., U.S. Pat. No. 5,277,441 to Sinnhuber, and U.S. Pat. No. 5,231,253 to Breed et al.

While each one of these known sensor arrangements are more suitable than a modified conventional frontal crash discrimination system for side impact situations, each known arrangement suffers from inherent drawbacks. For example, contact switches only provide a one bit binary output (i.e., "on" or "off") which are typically based on the exceeding of a certain threshold of force. These thresholds must be carefully adjusted to allow the system to differentiate severe crashes from situations like door slams, opening of the door into a pole, etc. Pressure transducers only provide an output which is responsive to total force across the entire surface without being able to distinguish or isolate the force at different locations on the surface. Silicon accelerometers are only able to typically provide a very limited number of data samples within the allowed decision period, and therefore do not provide enough information to make reliable decisions. Furthermore, none of these known arrangements are suitable for reliably predicting the occurrence of a severe surface impact so that the safety restraint device can be actuated as early as possible.

One significant solution to the above-noted deficiencies with the prior art is disclosed in a commonly assigned, copending U.S. patent application, Ser. No. 08/207,279, filed on Mar. 7, 1994, entitled "Vehicle Impact Detection System," wherein a vehicle impact system is formed by affixing an array of sensors to an outer surface of the vehicle. The sensor array continuously provides a two dimensional output representative of the condition of the outer surface to a processor circuit tracking and analysis via advance array signal processing.

While this arrangement successfully overcomes the problems of the prior art side impact detection systems, servicing of the multiple surface sensor array will typically involve replacement of the entire affected outer surface area of the vehicle. Thus, the cost, time, and complexity of servicing of the impact detection system could be undesirably high.

SUMMARY OF THE INVENTION

Therefore, an object of the present invention is to provide a vehicle impact detection system which can reliably predict the need to deploy an occupant safety restraint within a few milliseconds of an initial vehicle impact.

Another object of the present invention is to provide a vehicle impact detection system for controlling actuation of an occupant safety restraint device which can reliably predict and differentiate severe vehicle side impacts from minor side impacts.

A further object of the present invention is to provide a vehicle impact detection system which utilizes a single point outer surface sensor which can reliably facilitate prediction of severe impacts within a few milliseconds of the initial contact.

Yet another object of the present invention is to provide a vehicle impact detection system which can reliably predict and differentiate severe vehicle side impacts from minor side impacts, and which is arranged so as to reduce the cost and complexity of servicing.

In accordance with the present invention, a system for controlling actuation of a vehicle occupant safety restraint device in response to an impact with an outer surface of the vehicle comprises a first sensor means affixed to the outer surface of the vehicle for generating a continuous first output signal representative of a condition of the outer surface, a second sensor means affixed to an inner surface of the vehicle for producing a second output signal if the outer surface has been deformed to be in contact with the second sensor means, and a processor means for monitoring the first output signal. The processor means comprises means for performing signal analysis on the continuous first output signal to determine whether the first output signal is indicative of an impact of sufficient severity to require actuation of the safety restraint device, and prediction means responsive to the signal analysis means to generate a third output signal at a calculated time t. The occupant safety restraint device is actuated in response to the second and third output signal being coexistent, i.e., generated at substantially the same time.

In further accordance with the present invention the first sensor means comprises a vibratory sensor, the second sensor comprises a binary crush sensor affixed to an inner, internal surface of a vehicle door, and the outer surface comprises an outer side surface of the vehicle.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
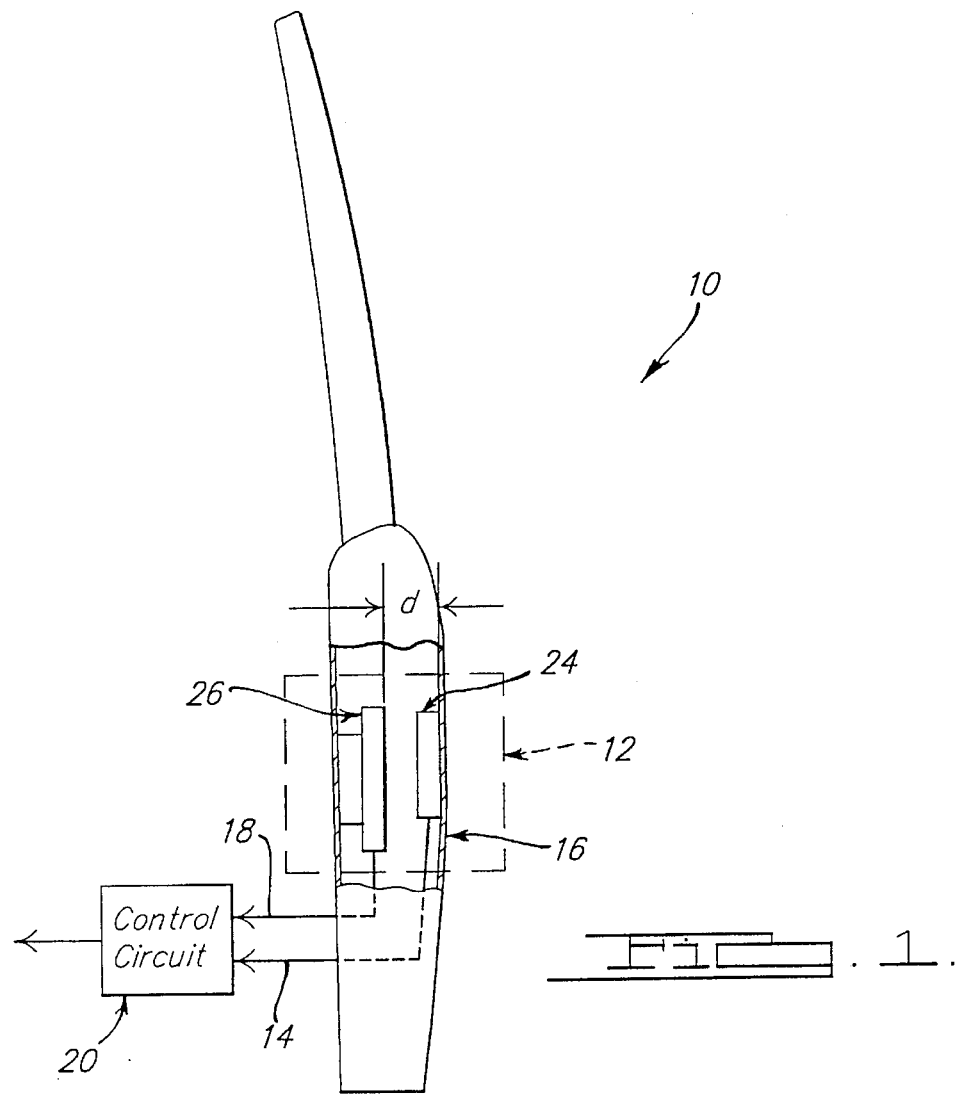
FIG. 1 is a side-view representation of a vehicle door illustrating a vehicle impact detection system in accordance with the present invention.
Figure 2:
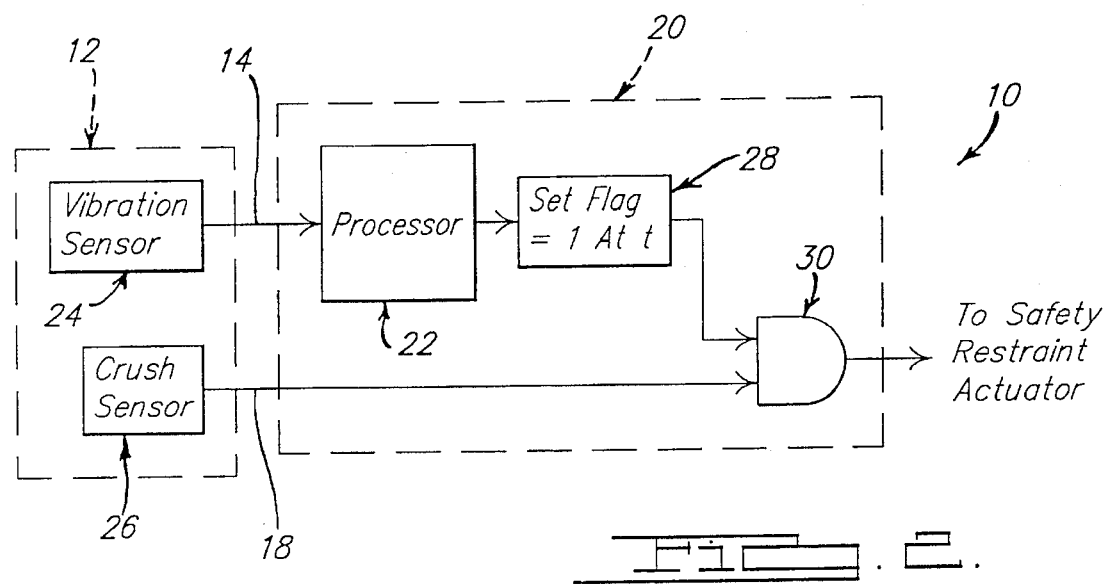
FIG. 2 is a schematic block diagram illustration showing the dual, independent sensor arrangement in accordance with the present invention.

As shown in FIGS. 1 and 2, the vehicle impact detection system 10 of the present invention comprises a dual, independent sensor arrangement 12 for providing a continuous first output signal 14 representative of the state or condition of an outer vehicle surface such as the outer door skin 16, fenders, or other outer side surfaces of the vehicle, and a second output signal 18 which is produced only when a crash severe enough to crumple the outer door skin 16 has occurred. A control circuit 20 utilizes a processor 22 to perform signal processing on the continuous output signal 14. As described hereinbelow, the processor 22 is programmed to provide an analysis of the sensed surface condition to distinguish deployment situations from nondeployment situations by evaluating vehicle outer surface contact to predict crash severity.

The dual, independent sensor arrangement 12 of the present invention is formed by two independently operating sensor elements 24 and 26. The first sensor element 24 comprises a vibratory transducer connected to suitable processing circuitry, such as an amplifier and bandpass filter. For example, the vibratory transducer sensor 24 produces a continuously oscillating output to generate the first output signal 14. The frequency of the vibratory sensor output is dependent on the condition of the vehicle outer skin 16, and that different identifiable frequencies are produced in response to the different forces experienced by the outer skin during specific types of vehicle crash and/or impact situations.

The second sensor element 26 comprises a binary type crush sensor switch which produces the second output signal 18 whenever the crush sensor experiences a force great enough to close an integrated switch mechanism. In the present invention, the crush sensor 26 produces the output signal 18 whenever a crash has occurred which is severe enough to crush the outer skin 16 a predetermined distance d. The distance d is used to roughly discriminate between deployment and nondeployment situations. In other words, a vehicle crash which is severe enough to warrant deployment of an air bag will crush the outer skin a distance of at least d.

In operation, the processor 22 monitors and analyzes the first output signal 14 to predict the type and severity of a side impact based on the detected frequency characteristics of signal 14. For example, the processor 22 could match the frequency characteristics to data representative of different degrees of crash type and severity located in look-up tables stored in a memory (not shown). If the predicted impact is of the type that suggests the potential need for deployment of the passenger safety restraint, the processor can then predict the time at which the crush sensor 26 should generate the output signal 18. If the crush sensor 26 generates the output signal 18 at the predicted time, a fire signal is generated to actuate deployment of the passenger safety restraint device.

This operation is symbolically illustrated in FIG. 2 by processor 22 setting a flag 28 high to produce a "1" at an input to an AND gate 30 at a calculated/predicted time t. If the output signal 18 appears as a "1" at the other AND gate 30 input at time t, then the fire signal is generated at the AND gate 30 output. By continuously correlating and tracking the vibratory sensor output 14, and matching the results against the crush sensor output 18, processor 22 can reliably predict deployment situations within a few milliseconds of the initial impact with the outer surface.

Because system 10 can reliably predict deployment situations within a few milliseconds, and subsequently instantly verify the prediction with the crush sensor output 18, the present invention is particularly suited for use in controlling the actuation of an air bag in response to side impacts. However, one of ordinary skill in the art will readily appreciate that the usefulness of the present invention to predict severe surface impacts within a very restricted period of time is not limited solely to vehicle side impacts.

Therefore, the dual, independent sensor arrangement 12 of the present invention advantageously utilizes the vehicle's own body structure to allow a single point outer sensor to effectively discriminate nondeployment situations, such as side impacts caused by a shopping cart, bicycle, etc., from severe impacts requiring deployment of the safety restraint without having to employ sophisticated and timely signal processing, or carefully tailor crush sensor thresholds, or rely on the ability of a processor to isolate the output of a pressure transducer. Further, since there is only a single point outer sensor 24, the cost and complexity of servicing the present invention is greatly reduced over a multiple sensor array system. However, since the condition of the outer surface of the vehicle is still being used to predict the type and severity of impact, a fast and reliable time-to-fire is maintained to permit deployment of the passenger safety restraint as early as possible.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A system for controlling actuation of a vehicle occupant safety restraint device in response to an impact with an outer surface of the vehicle comprising:

a first sensor means affixed to the outer surface of the vehicle for generating a continuous first output signal representative of a condition of the outer surface;

a second sensor means affixed to an inner surface of the vehicle for producing a second output signal if the outer surface has been deformed so as to be in contact with said second sensor means;

a processor means for monitoring said first sensor output signal comprising means for performing signal analysis on said continuous first output signal to determine whether said first output signal is indicative of an impact of sufficient severity to require actuation of the safety restraint device, and prediction means responsive to said signal analysis means for generating a third output signal at a calculated time t; and means for actuating the occupant safety restraint device if both said second and third output signals are coexistently generated.

2. The system of claim 1 wherein said first sensor means comprises a vibratory sensor.

3. The system of claim 1 wherein said second sensor means comprises a crush sensor positioned on an inner internal surface: of a vehicle door.

4. The system of claim 1 wherein the outer surface comprises an outer side surface of the vehicle.

* * * * *